US005505043A

United States Patent [19]

Baginski et al.

[11] Patent Number: 5,505,043

[45] Date of Patent: Apr. 9, 1996

[54] HYDRAULIC LIFT DEVICE FOR BATTERY OPERATED INDUSTRIAL TRUCKS OR THE LIKE

[75] Inventors: Ralf Baginski, Neetze; Hans-Peter Claussen, Norderstedt; Andreas Klatt, Hamburg; Hans-Joachim Doss, Hamburg; Jochen Körner, Hamburg, all of Germany

[73] Assignee: Jungheinrich Aktiengesellschaft, Hamburg, Germany

[21] Appl. No.: 250,514

[22] Filed: May 27, 1994

[30] Foreign Application Priority Data

May 28, 1993 [DE] Germany .......................... 43 17 782.4

[51] Int. Cl.[6] ............................ F16D 31/02; F15B 13/16

[52] U.S. Cl. ............................................... 60/477; 91/361

[58] Field of Search ....................... 91/361, 459; 60/477, 60/481, 368; 318/521, 494, 293, 294, 807, 801, 34, 37

[56] References Cited

U.S. PATENT DOCUMENTS

| | | | |
|---|---|---|---|
| 3,947,744 | 3/1976 | Grace et al. | 320/61 |
| 4,649,326 | 3/1987 | Mansmann et al. | 318/294 X |
| 4,757,248 | 7/1988 | Fujioka et al. | 318/807 |
| 5,012,722 | 5/1991 | McCormick | 91/361 |
| 5,021,725 | 6/1991 | Jimbo et al. | 318/807 X |
| 5,189,940 | 3/1993 | Hosseini et al. | 91/361 |
| 5,210,475 | 5/1993 | Juzswik et al. | 318/293 |

FOREIGN PATENT DOCUMENTS

| | | | |
|---|---|---|---|
| 2014605 | 3/1970 | Germany . | |
| 2618046 | 4/1976 | Germany . | |
| 3018156 | 5/1980 | Germany . | |
| 3602510 | 1/1987 | Germany . | |
| 0261088 | 10/1990 | Japan | 318/521 |
| 8405088 | 11/1988 | Sweden . | |
| 1380223 | 1/1975 | United Kingdom | 91/459 |

OTHER PUBLICATIONS

Hong and Park, "Microprocessor–Based High–Efficiency Drive of a DC Motor", IEEE Transactions on Industrial Electronics, vol. IE–34, No. 4, Nov. 1987.

*Primary Examiner*—Hoang Nguyen
*Attorney, Agent, or Firm*—Faegre & Benson

[57] ABSTRACT

A hydraulic lift device for battery operated industrial trucks comprising a hydraulic ram, a hydraulic machine operating as a pump in a load raising cycle and as a motor in a load lowering cycle, a separately excited DC machine operating as a motor in the load raising cycle and as a generator in the load lowering cycle, and energy recovering circuitry which is fed by the DC machine in the load lowering cycle. A load holding valve is disposed in the fluid path between the hydraulic ram and the hydraulic machine. Speed of the DC machine is set by a speed control. A separate field current control includes a desired value setting circuit for determining a desired value for the field current ($I_{FSoll}$) from a predetermined relationship between the speed ($n_{Ist}$) and the armature current ($I_{ASoll}$). Power switches are associated with the field winding and the armature, and are actuated by the current control. The power switches are arranged and controlled such than the intensity and the direction of the current through the armature and field winding are defined. The current control comprises a directional setting control for the lowering and raising cycle generating signals to control the load holding valve.

7 Claims, 6 Drawing Sheets

HYDRAULIC LIFT DEVICE FOR BATTERY OPERATED INDUSTRIAL TRUCKS OR THE LIKE

The present invention relates to a hydraulic lift device for battery operated industrial trucks or the like according to the preamble of claim 1.

Electrically operated industrial trucks are well-known using hydraulic rams for which the operating pressure is generated by a constant volume pump driven by an electric motor. The motor speed is controlled by actuating to a valve lever. This allows changes to the lifting speed without causing substantial throttling losses when the load is raised. In this connection, it is known to adjust the lowering speed through the valve lever and to provide a directional control valve in the hydraulic lowering line. Accordingly, the potential energy of the load is converted into heat by throttling the fluid through the directional control valve with the heated fluid being returned to the tank. However, it is known to recover the energy of the load by charging the battery through the electrical motor operating as a generator.

DE 20 14 605 discloses a DC parallel wound motor in combination with a rotary piston pump having a variable delivery volume. By adjusting the volume control of the pump to be displaced from a center position the volume is increased from zero to a maximum volume independent of the displacing direction of the control, wherein the pump operates as a pump when the volume control is moved in the one direction, but operates as a motor when being moved in the other direction while maintaining the direction of rotation. DE 26 18 046 discloses separate hydraulic branches for lifting and lowering which are associated with a DC motor and a pump each as well as a hydraulic motor and a generator each. For lowering, a constant flow valve provides a fixed lowering speed. A manually controlled valve allows switching between raising and lowering.

DE 30 18 156 teaches controlled solenoid valves for raising and lowering to provide starting and braking slopes. A volume flow measurement serves to control the motor or, respectively, the generator. A squirrel cage induction motor is used as the driving unit. SE 84 05 088 teaches using a compound machine as motor or, respectively, generator, wherein a portion of the series wound coils is taken out when the machine operates as a generator in the lowering operation of the lifting means. The control of the lift cylinder is performed by a manually actuated valve disposed in the pressurized fluid line.

U.S. Pat. No. 3,947,744 discloses a separate three-phase machine for recovering energy while lowering a lift cylinder. The braking force in lowering can be adjusted by controlling the field of the generator.

Finally, DE 36 02 510 teaches to couple a series wound machine to a hydraulic machine. A control valve system is provided in the fluid path comprising a proportional valve, wherein the ram control opens the proportional valve in accordance with a sloping function for the load lowering operation and activates the recovery circuitry in response to the output current of the DC machine operating as a generator when the generator output current exceeds a predetermined value. Accordingly, the device referred to operates in a limited range by utilizing a hydraulic throttling such that the potential energy of the load cannot be recovered. Furthermore, transients are generated in changing from the hydraulic control of the lowering speed through the throttle to an electrical control by means of the motor and the pump, which transients result in a jerky change of the lowering speed.

STATEMENT OF THE INVENTION

It is an object of the present invention to provide a hydraulic lift device for battery operated industrial trucks which permits a sensitive lowering operation, not encountering substantial hydraulic losses, but resulting in an optimum energy recovery during the descending operation.

According to the invention, the object referred to is solved by the features of claims 1 and 6.

According to the invention there is merely provided a load holding valve disposed in the pressurized fluid path which valve is either open or closed and which does not generate any throttling losses in the opened position. Still further, according to the invention, a separately excited DC machine is provided which permits during the motor cycle as well as the generator cycle the individual adjustment of the excitation and the armature voltage. To this end, the lift device according to the invention provides a separate field current controller including a desired value adjusting means determining the desired value of the field current as based on predetermined relations between the speed and the armature current. It is known from "Microprocessor-Based High-Efficiency Drive of a DC Motor", published in IEEE Transactions on Industrial Electronics Vol. IE 34, No. 4, November 1987, pages 433 to 440, to control the armature and field such that the desired value for the field current is determined from predetermined relations between speed and armature current i.e. the actual value of the armature current. For this, a respective algorithm or a respective look-up table is to be provided.

The circuitry referred to permits the operation of the DC machine through the full operational range as required by the hydraulic system for raising and lowering the load. Additional hydraulic components are not required. During the lowering cycle a maximum of recoverable potential energy will be recovered. Still further, during lowering, there is no transient from the hydraulic to the electrical load holding resulting in a better handling of the lowering cycle for the operator.

Controlling or, respectively, setting the desired value for the lift cylinder is performed by an electrical signal, for example by means of a manually actuated potentiometer, wherein a directional adjusting means is additionally provided to generate signals indicating the raising or the lowering cycle and controlling the load holding valve. At the instant in which the load holding valve is opened when the load is in the lifted condition, hydraulic fluid begins to flow through the hydraulic machine driving the DC machine acting as a generator. However, as the desired value is still zero, the control tries to reach this value, whereby the respective power switch for the armature is fully turned on. The power switches for the field winding are actuated such that the current is at a maximum value. Thereby, a maximum braking torque will be produced which is sufficient to lower the load with a minimum speed in case this is desired. By correspondingly setting the desired speed value, the raising and lowering speed may be set to a desired value.

According to a preferred embodiment the invention, the desired value setting means for the field current determines the desired field current from the desired armature current and the actual speed. This has the advantage that the speed control may operate as well in the operational range in which an armature voltage is required higher than the battery voltage to perform the lowering at optimum efficiency in the generator cycle.

Instead of a separately excited DC machine, a three-phase induction machine may be utilized as well which is performed by a converter. A speed controller determines the actual rotor frequency of the machine by means of a speed sensor and generates an error signal through a comparison with a desired speed signal or a desired frequency signal to obtain the desired speed signal for raising and lowering. Depending on whether the difference between the actual and desired frequency indicates a positive or a negative slip, the induction machine operates as a motor or as a generator. Recharging electrical energy into the battery is automatically performed eliminating any particular measures to be performed. With respect to trucks having at least a movable mast portion to which the load carrying means is secured to be adjustable in height, one distinguishes between the mast lift and the so-called free lift. "Free lift" means displacing the load carrying means along the movable mast portion, while "mast lift" means the displacement of the movable mast portion. It should be understood that the hydraulic rams for the components referred to may have different cross-sections thus displacing different flow volumes. In case there are no particular provisions met, operating the system in the lowering cycle results in different lowering speeds. According to an embodiment of the invention, a sensor is provided at the lift mast to determine whether a lowering cycle of the movable mast portion or of the load carrying means is performed generating signals which are fed to the setting means for the desired speed signal for modifying the desired speed signal.

Known industrial trucks provide for the performance of auxiliary functions by means of the hydraulic system of the lifting device. According to the invention, a separate unit comprising a pump and a DC motor is provided for performing the auxiliary functions. Otherwise, energy could not be recovered during the lowering operation, when the hydraulic machine must operate as a pump for supplying fluid to the auxiliary functional means at the same time. The additional expenditure for the additional pump unit, however, is justified with a view to an optimum value for recovering energy during the lowering operation.

In some cases, the auxiliary functions require a relatively high flow volume or, respectively, a high pressure. As this is but rarely the case, an adaquate sizing of the additional pump unit would make no sense for most applications. Therefore, it may be well considered to use the hydraulic machine as a pump in this case and to dispense momentarily with energy recovery while lowering.

BRIEF DESCRIPTION OF THE DRAWINGS

Further objects and advantages of the invention will become apparent from the following description taken in conjunction with the accompanying drawings in which.

DESCRIPTION OF THE PREFERRED EMBODIMENTS

Figure 1:
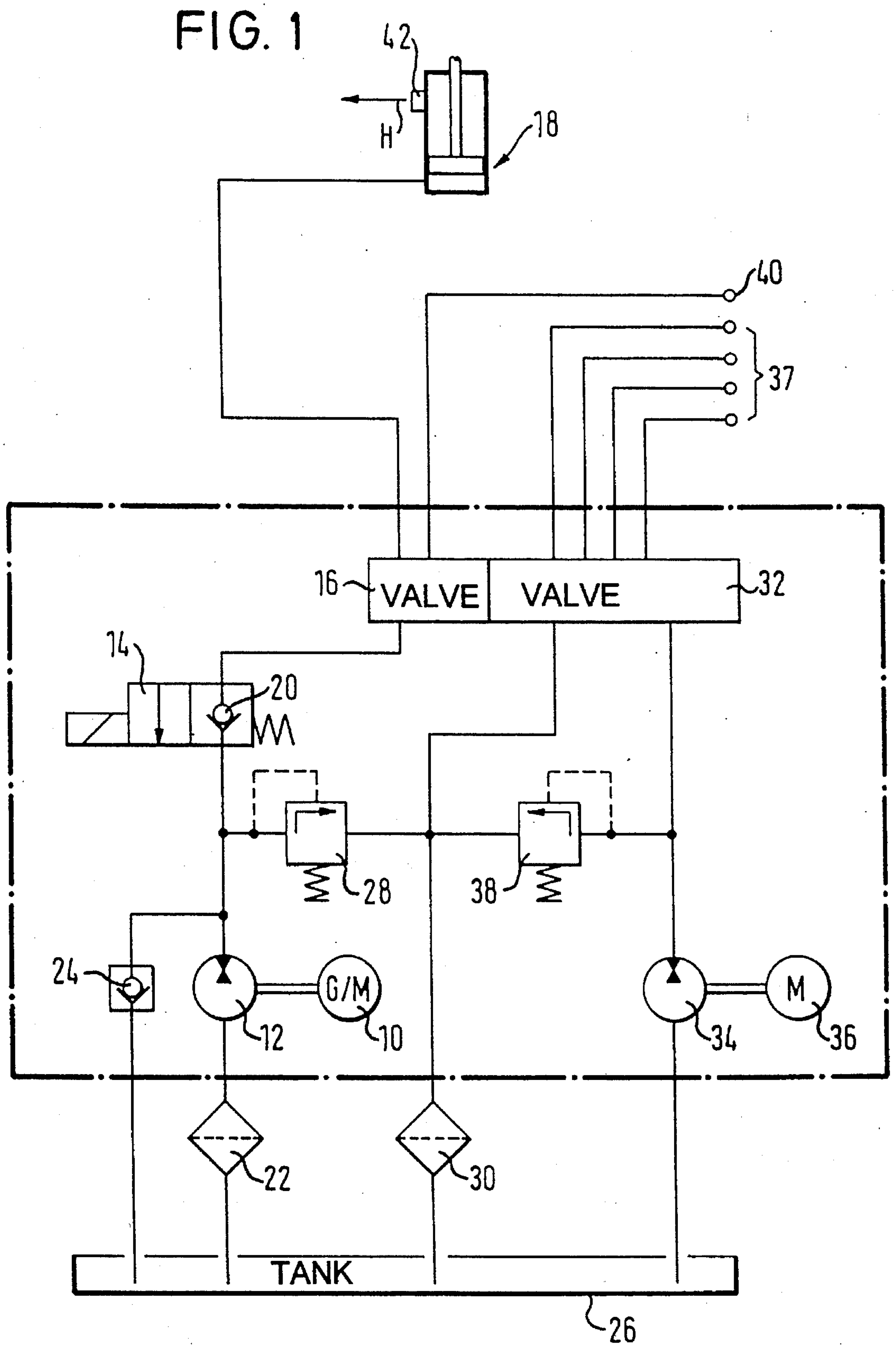
FIG. 1 is a schematic hydraulic lifting circuit according to the invention.
Figure 2:
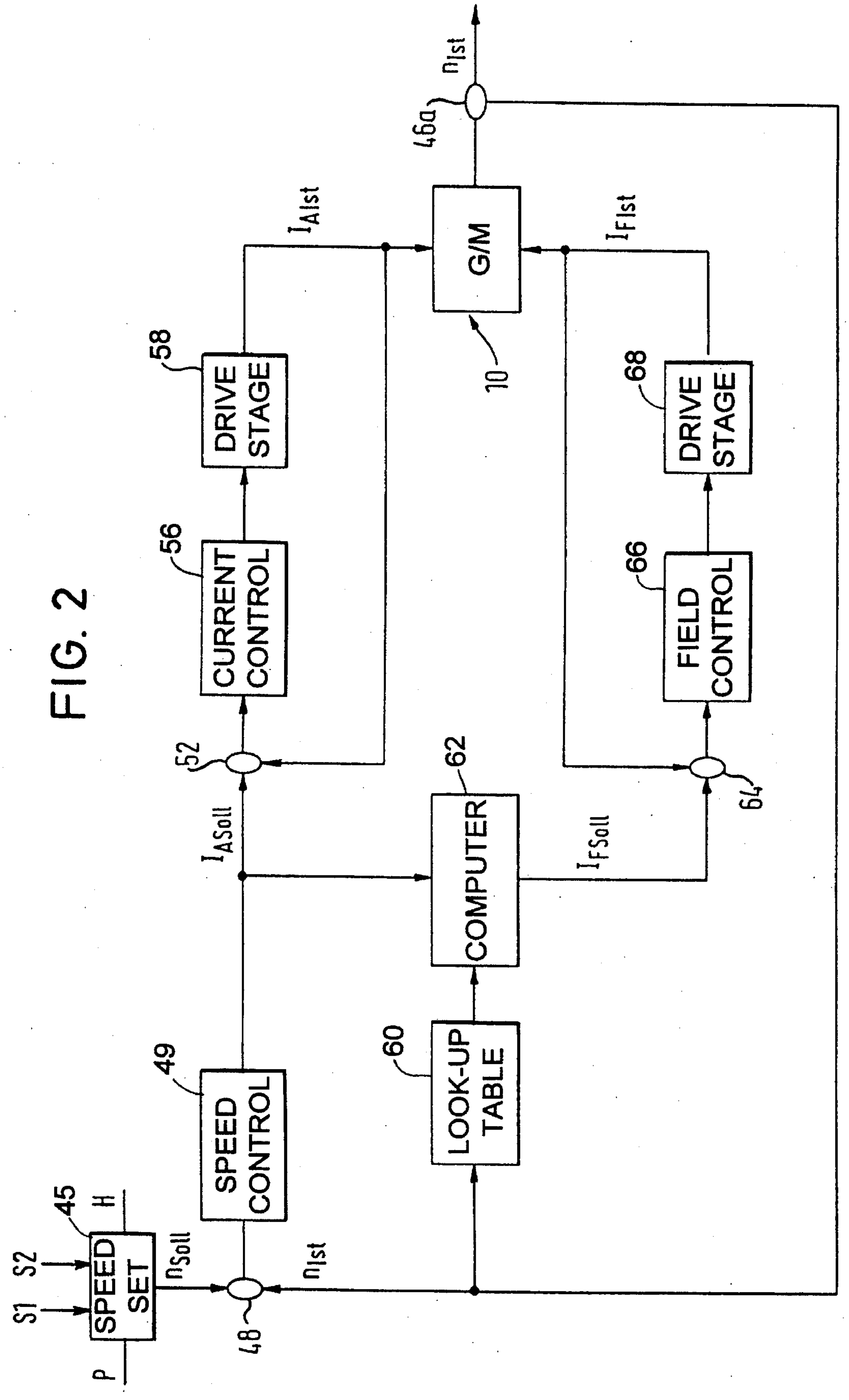
FIG. 2 is a schematic electrical circuit for controlling the hydraulic circuit of FIG. 1.

A DC machine 10 drives a hydraulic machine 12 operating either as a motor or as a pump. During pumping, the pump 12 delivers fluid through a load holding valve 14 and a valve 16 to a lift ram 18. The lift ram 18 may comprise a single cylinder or a plurality of cylinders to raise or, respectively, to lower the movable mast courses and/or the load carriage (lowering is not illustrated). The load holding valve 14 includes a check or ball valve 20. A further check valve 24 is provided in a line bypassing the hydraulic machine 12 and a filter 22. There is hydraulic fluid in the tank 26. In a further bypass conduit to the tank 26 including a further filter 30, there is a pressure relief valve 28. The bypass is further connected to a valve 32 to which fluid is supplied by a hydraulic pump 34 which is driven by a DC motor 36. The valve 32 delivers fluid to a number of auxiliary means 37. The capacity of the unit 34, 36 is relatively small with respect to the capacity of the unit 10, 12. The bypass is further provided with a pressure relief valve 38.

The valve 16 is designed such that it selectively connects the load holding valve 14 to the lift cylinder 18 or to a secondary load 40. In the raising operation of the ram 18, the pump 12 is driven by the separately excited DC motor 10 delivering fluid from the tank 26 through the filter 22 and the ball valve 20 and the valve 16 to the hydraulic ram 18. After terminating the raising operation the load is supported on the ball valve 20 of the load holding valve 14 to prevent a sagging of the load.

The series wound motor 36 connected to battery voltage through a conductor drives the pump 34 delivering the fluid from the tank 26 through the manually controlled valve 32 to the auxiliary means 37. The fluid return is completed through the filter 30 to the tank 26. The raising operation and actuating the auxiliary means do not interfere with each other.

For the lowering operation, the load holding valve is electrically bowered to pass the pressurized fluid accumulated in the hydraulic ram to the hydraulic machine 12 which is now operated as a motor in a direction of rotation inverse with respect to the raising operation. The separately excited DC machine 10 operates as a generator, wherein the speed is directly proportional to the lowering speed apart from losses due to leckage in the hydraulic machine 12. Except for the load holding valve 14, the switch over valve 16 and the delivering and returning hoses, there are no further hydraulic components in the conduit used in the lowering operation which could result in additional pressure losses thus leding to reducing the efficiency. In case the lift system comprises a free lift cylinder and a pair of mast lift cylinders, the hydraulic fluid volume of the mast lift cylinder is first emptied during lowering. Sensor 42 is associated to the lift cylinder and or, respectively, the mast to indicate when switching over from the mast lift to the free lift occurs during the lowering operation.

In performing a secondary action, the secondary load 40 such as a mounted device may be supplied with pressurized fluid from the pump 12 parallel to the hydraulic ram 18. The flow volume is distributed through the valve 16 which may be designed as a load sensing valve.

If during lowering the secondary load 40 is required to be operated, the lowering operation must be interrupted. The valve 16 shuts off the flow volume from the ram 18. The separately excited DC machine 10 which has been operated as a generator during lowering, reverses and drives the hydraulic machine 12 at a substantially constant speed. The machine 12 delivers the flow volume required for operating the secondary load 40.

The speed control of the separately excited DC machine 10 of the system shown in FIG. 1 will be explained in more detail with reference to FIGS. 2 to 7.

Figure 4:
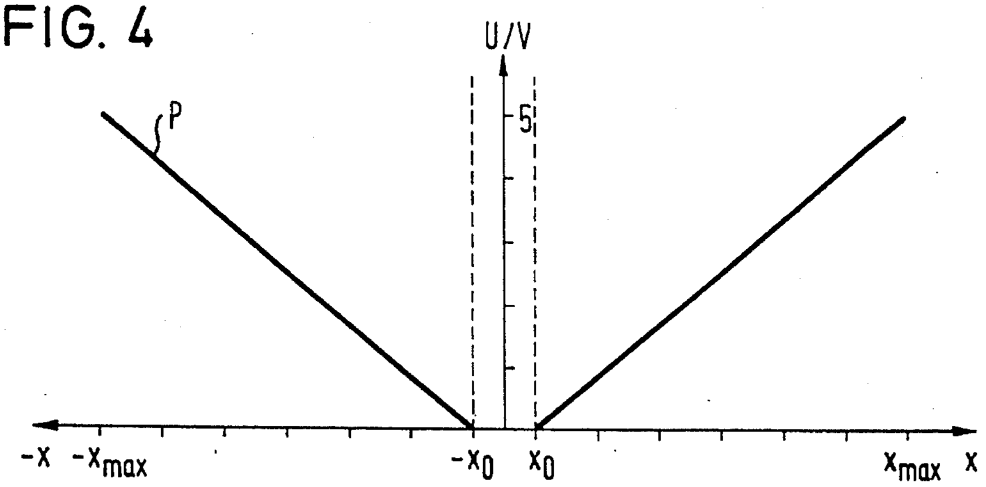
FIGS. 4, 5 and 6 are diagrams of control signals according to the invention.
Figure 5:
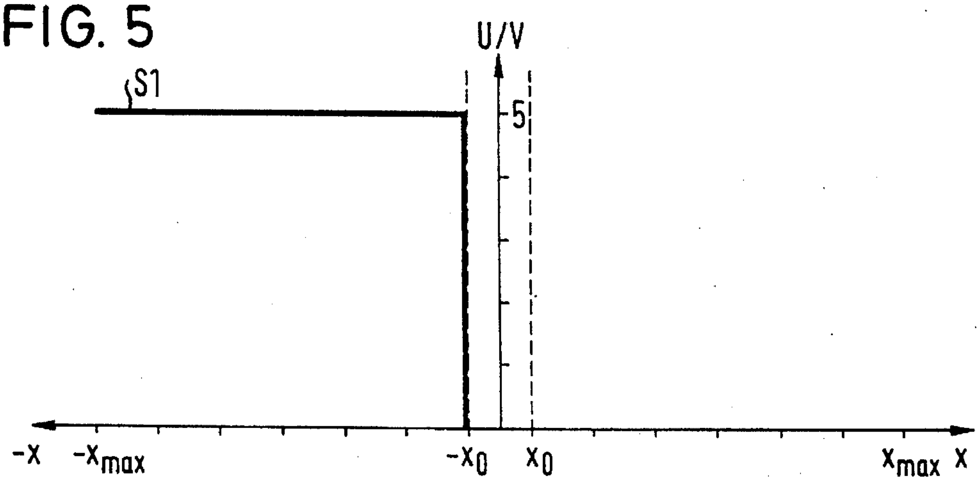
Figure 6:
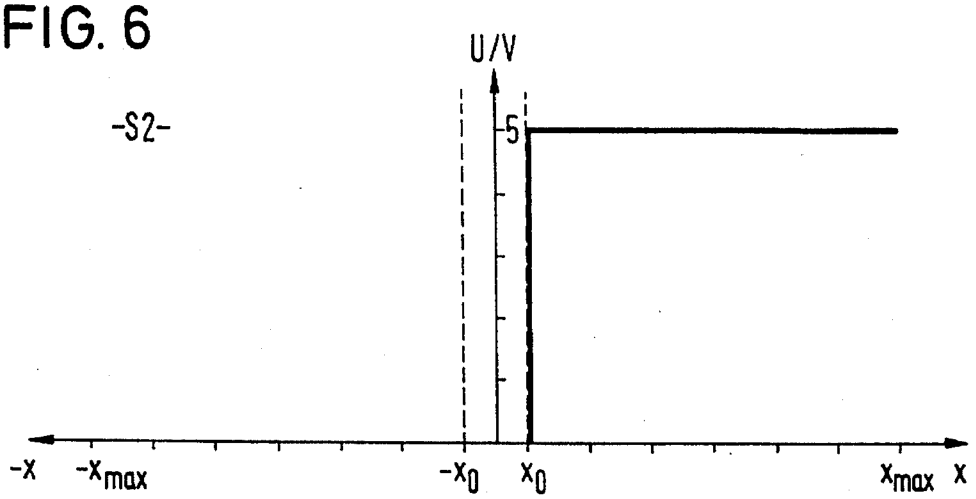
Figure 7:
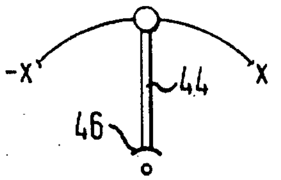
FIG. 7 shows a manually activated lever for the lifting device according to the invention.

FIG. 7 shows a hand-lever 44 which is arranged to be pivoted to the left and to the right, wherein the pivotal rate is defined by –X and +X. The lever adjusts a potentiometer 46 generating a signal P in response to the pivotal rate. The signal P is shown in FIG. 4. As the pivotal-responsive signals shown in FIG. 4 do not distinguish by their sign, a pair of micro switches (not shown) is associated to the lever 44 to determine the sign of the signal P. This is indicated by the signals S1 and S2 in FIGS. 5 and 6. A desired speed setting device 45 calculates a desired speed value $n_{Soll}$ from the signals P S1 and S2, wherein the absolute value of P determines the absolute value of $n_{Soll}$ and the signals S1 and S2 determine the proper sign. When the setting device 45 receives the signal, the desired speed value will be modified correspondingly to maintain the lowering speed constant (this is explained in more detail below). A speed sensor **46*a* coupled to the DC machine 10 delivers an actual speed signal $n_{Ist}$ to a comparing stage 48 for comparing with the desired speed value; the error signal is supplied to a speed control 49 which generates a desired armature current $I_{ASoll}$ which is compared in a comparing stage 52 with the actual armature current $I_{AIst}$. The error signal is fed to an armature current controller 56 and from there to a driving stage 58**.

The relations between speed and armature current are stored in a look-up table 60. A calculating means 62 uses the data from the look-up table 60 to calculate a desired field winding $I_{FSoll}$. It is substantial to this calculation that the desired armature current $I_{ASoll}$ is used. The desired value $I_{FSoll}$ is compared in a comparing stage 64 with the actual field winding current, wherein the error signal is fed to a field winding controller 66 generating a corresponding drive signal in the driving stage 68. The controllers 56, 66 are designed to be digital control circuits generating pulse width modulated voltages in power stages 58, 68 which voltages serve to adjust the predetermined current values $I_{ASoll}$ and $I_{FSoll}$. In view of the fact that for calculating the desired field current $I_{FSoll}$ the desired armature current $I_{ASoll}$ is used as an input signal in addition to the actual speed value $n_{Ist}$, the system may operate in an operational range in which an armature voltage higher than the battery voltage would be required to lower a load in the generator operation working at an optimum efficiency as to be described later.

Figure 3:
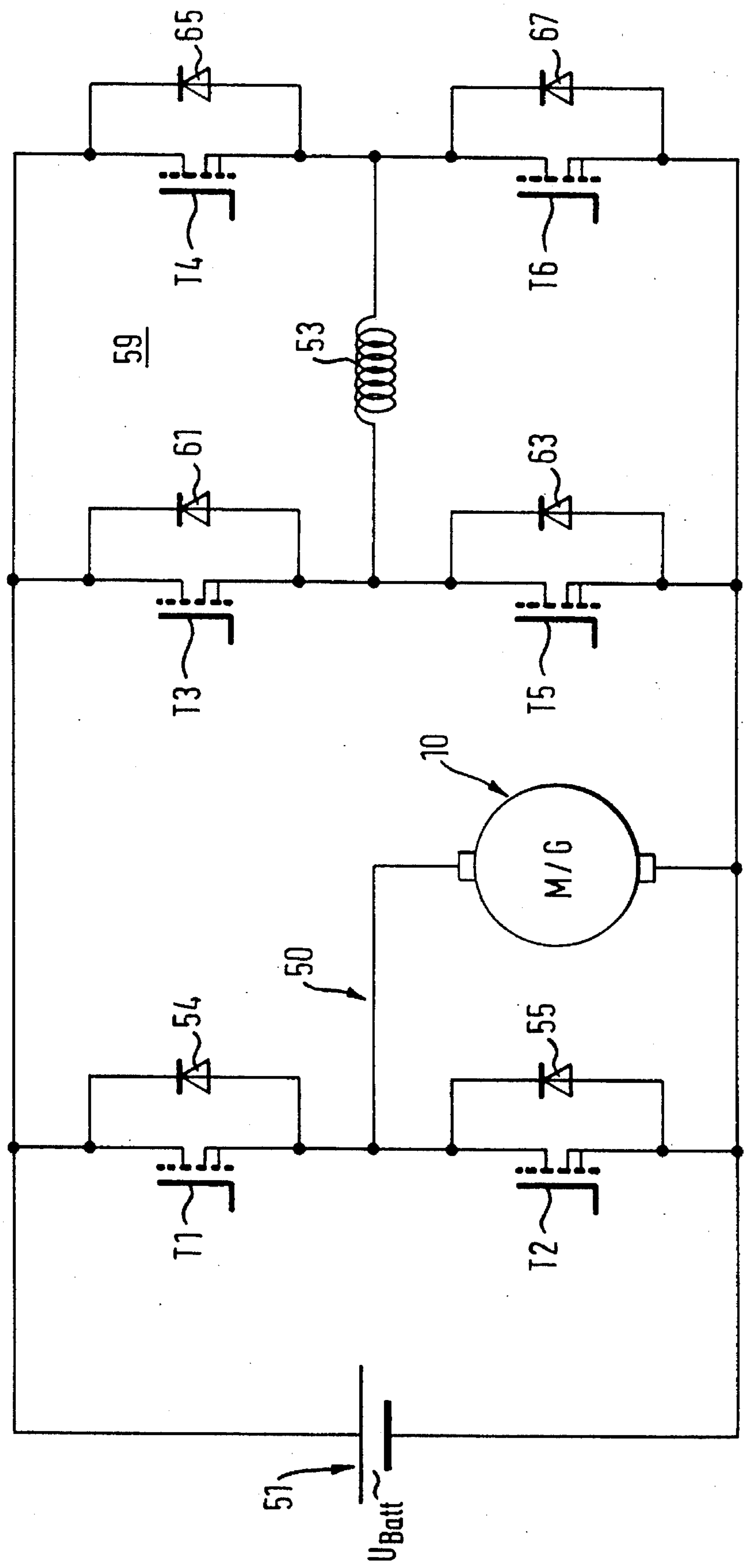
FIG. 3 is a schematic electrical circuit of the power stages of the DC machine of FIGS. 1 and 2.

As FIG. 3 shows, the armature of the separately excited DC machine 10 is connected through a half-bridge 50 comprising Mosfets T1 and T2 to a battery 51. Diodes 54, 56 are connected antiparallel to the Mosfets T1 and T2. The field winding 53 is arranged in the bridging branch of the bridge circuit 59 which is connected to the terminals of the battery 51, wherein the bridge circuit comprises Mosfets T3 to T6 including antiparallel connected diodes 61 to 67.

The Mosfets T1 and T2 are cyclically controlled, i.e. the Mosfet T1 is switched off when T2 is on and vice versa. The current intensity thus results from the duty factor of the pulses delivered to the Mosfets T1 and T2. The same applies to the Mosfets T3 to T6 which are switched on and off overcross. Mosfet T1 acts as a so-called low setting means in the motor cycle lifting operation and Mosfet T2 acts as a high setting means in the generator cycle lowering operation.

When the lever 44 is moved from the rest position towards lowering so that a signal S2 is generated for requiring a lowering operation, while signal P still indicates a desired speed value $n_{Soll}=0$, the signal S2 functions to open the load holding valve 14, whereby hydraulic fluid flows through the hydraulic machine 12 to drive the DC machine 10. Due to the continuous error signal occurring this way, a desired armature current value $I_{ASoll}$ is fed to the comparing stage 52 and the armature current controller 56 provides for short circuiting the armature via Mosfet T2. Still further, a maximum field current is supplied to the field winding 53. The speed thus resulting is that lower than the smallest possible lowering speed resulting therefrom is sufficient to provide for a sensitive displacement of the ram 18. In this mode of operating the DC machine 10, there is no recovery of energy fed to the battery 52.

However, when the lever is continued to be pivoted until a desired speed $n_{Soll} > 0$ is adjusted, the controller 56 reduces the pulse width of the Mosfet T2 from the control at 100% until the desired speed $n_{Soll}$ is obtained. The Mosfet T2 now operates at each pulse width < 100% as an high setting means and energy is recovered in the battery 52.

Figure 8:
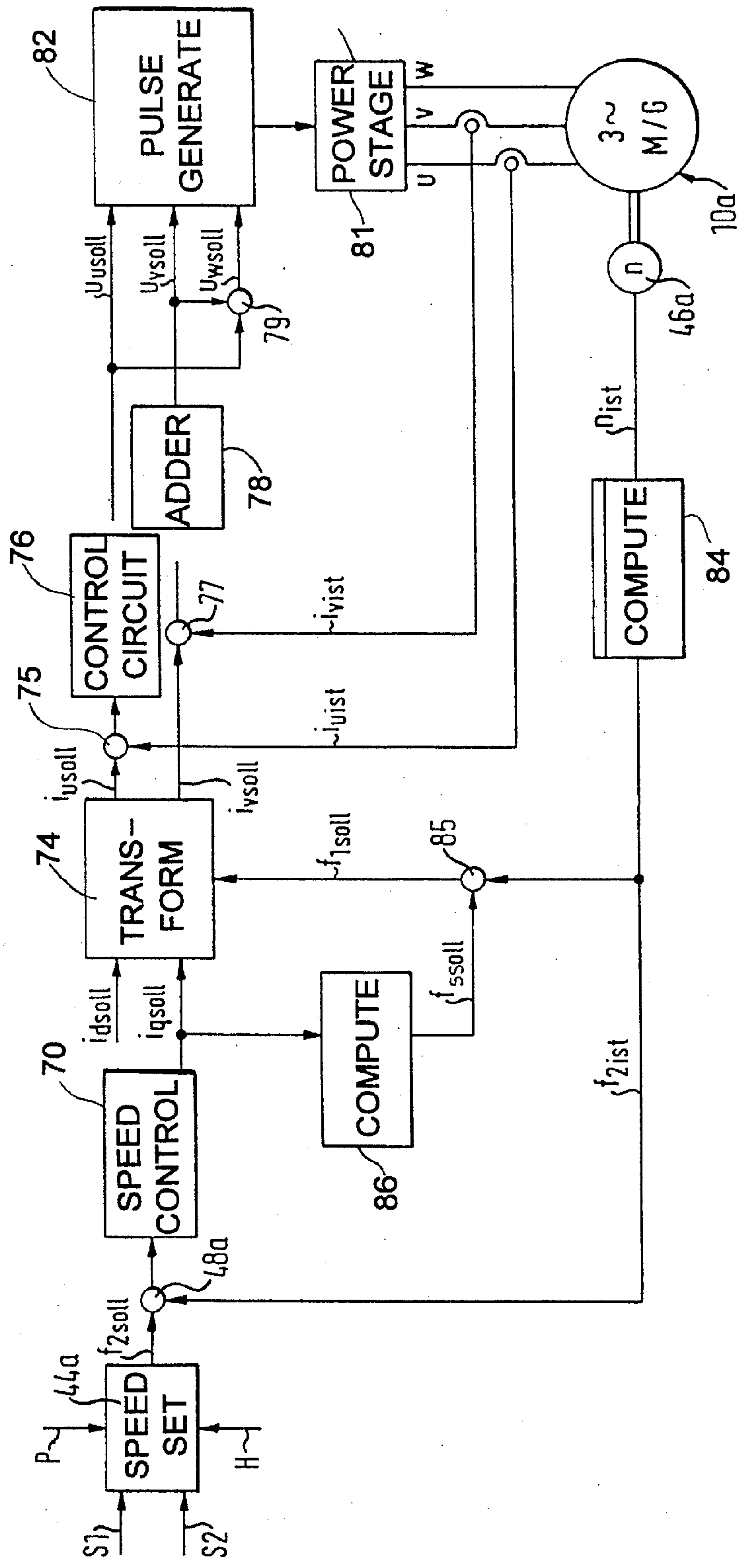
FIG. 8 is a schematic electrical circuit for controlling a lifting device similar to FIG. 1 including a three-phase induction machine.

As shown in FIG. 8, a desired speed setting means **44*a* calculates a desired rotor frequency value $f_{2soll}$ from signals P, S1 and S2 for a three-phase induction motor 10*a* which replaces the separately excited DC machine shown in FIG. 1. The signal P fed to the setting means 44*a* corresponds to the pivotal rate of the manual lever shown in FIG. 7. The signal sign is determined by micro switches (not shown) associated to the lever 44. Signals S1 and S2 thus determine the sign. A speed sensor 46*a* coupled to the machine 10*a* supplies an actual speed value $n_{Ist}$ which is supplied to a calculating circuit 84 which calculates the actual value $f_{2ist}$ of the rotor frequency corresponding to the number p of the pair of pulses of the machine 10*a*. The actual frequency value is fed to the comparing stage 48*a* and the error signal is fed to a speed controller 70**.

The speed controller 70 generates a desired value for the active component $i_{qsoll}$ of the complexe phasor i. The active component $i_{qsoll}$ is proportional to the torque of the induction machine **10*a*. The value $i_{dsoll}$ defines the desired value of the reactive component of the phasor i which is proportional to the magnitizing current of the induction machine. The desired value for the slip frequency $f_{ssoll}$ is calculated at 86 from the desired volume of the active component $i_{qsoll}$. Circuitry 86 may comprise a look-up table to provide for the relation between the active current and the slip frequency. It should be understood that an equivalent network of the induction machine may be stored in circuitry 86** thus allowing to determine the associate slip frequency with relatively high accuracy.

The slip frequency $f_{ssoll}$ thus determined is added to the actual rotor frequency value $f_{2ist}$ in circuitry 85. This results in the desired stator frequency value $f_{1soll}$ which is supplied to a rotary transforming circuitry 74. The complexe current phasor i resulting from $i_{qsoll}$, $i_{dsoll}$ and $f_{1soll}$ is transformed resulting in the desired phase currents $i_{usoll}$ and $i_{vsoll}$. The respective error signals which result in the adding stages 75 and 77 by subtracting from the respective actual current values $i_{uist}$ and $i_{vist}$ are supplied to the current controller 76 and 78 which deliver the setting values for the phase voltages $U_{usoll}$ and $U_{vsoll}$. The desired value of the third phase voltage $U_{wsoll}$ may be calculated in the adding stage 79 based on the condition that the sum of all three voltages must be zero.

The three voltage setting values are now converted to pulse width modulation signals in circuitry 82 to control a power stage 81 such that the desired current values are provided in the induction machine **10*a***.

Figure 9:
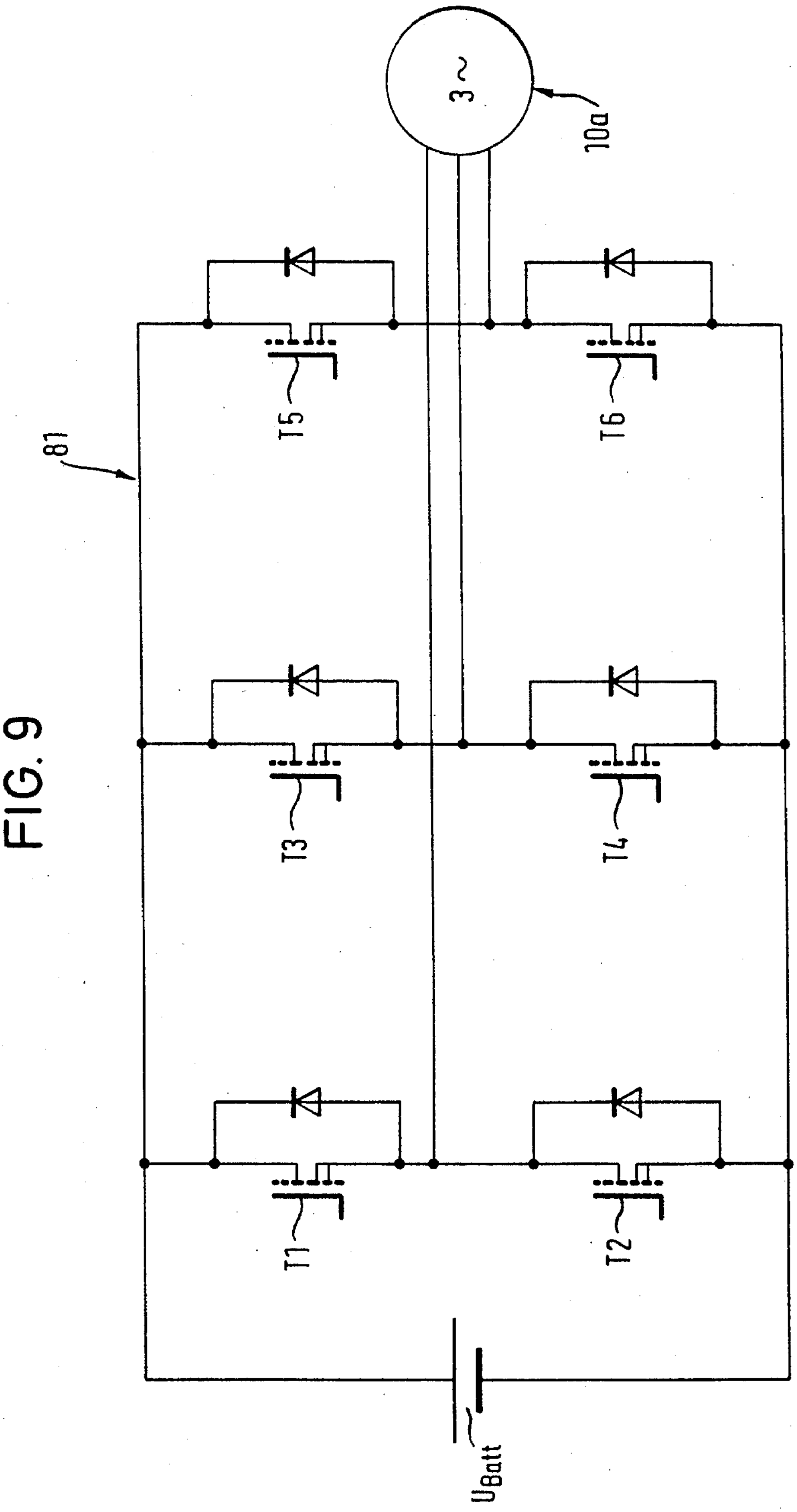
FIG. 9 is a schematic electrical circuit of the power stage of the induction machine of FIG. 8.

Details of the power stage 81 are shown in the diagram of FIG. 9.

FIG. 9 shows that a phase each of the induction machine 10*a* is connected to the interconnection each of a pair of series-connected Mosfets T1 to T6 each connected to a battery $U_{Batt}$. The transistors T1 through T6 are operated with a sinus-weighted pulse widths and are anticylically controlled in pairs. The control of the three pairs of transistors is designed such that the sinus-weighted pulse width signals for controlling the pairs of transistors are supplied to the pairs of transistors with the frequency of the sinus weighting each offset in phase about 120°. This control process generates a rotative field in the induction machine 10*a* which is variable in frequency and voltage.

Comparing the frequencies $f_{ssoll}$ and $f_{2ist}$ yields a sign of the desired frequency value $f_{ssoll}$ determining whether the induction machine 10*a* operates as a motor or as a generator. Accordingly, the battery is automatically charged without any further procedures to be taken when the induction machine 10*a* operates as a generator in FIG. 9.

When the lever 44 in FIG. 7 is adjusted from the rest position towards lowering such that signal $S_2$ is generated to require the lowering operation, while the signal P still indicates a desired rotor frequency $f_2$= zero, the signal $S_2$ is effective to open the load holding valve 14 (FIG. 1) whereby hydraulic fluid flows through the machine 10 which now drives the induction machine 10*a*. The control now operates to adjust the lowest possible stator field frequency at the lower control limit which is around 0,2 Hz. Caused by the slip of the induction machine 10*a*, a continuous error signal results. The speed resulting therefrom is small so that the lowest possible lowering speed resulting is sufficient to provide a sensitive response of the hydraulic ram 18 (FIG. 1).

We claim:

1. A lift device for battery operated industrial trucks, comprising at least a hydraulic ram to elevate or lower a load in an operative range, a hydraulic power pack operating as a pump in a load raising cycle by delivering pressurized fluid to said ram and operating as a motor in the load lowering cycle in driving the hydraulic power pack by pressurized fluid displaced from said ram, DC power means having an armature and coupled to the hydraulic power pack operating as a motor in the load raising cycle and as a generator in the load lowering cycle, and energy recovering circuitry fed by said DC power means in the load lowering cycle, valve means disposed in the fluid path between said hydraulic ram and said hydraulic power pack to hold said load at desired positions of said hydraulic ram, control means actuating said valve means, said control means including a directional sensor, said control means further including a speed control means controlling the speed of said DC power means, characterized by said valve means having a single load holding valve operating free of loss in its opened position, said DC power means being of the separately excited type and including a separate field current control means including a desired value setting means for determining field current ($I_{FSoll}$) from predetermined relations between said speed of said DC power means ($n_{Ist}$) and the armature current ($I_{ASoll}$) and wherein said speed control means is responsive for said holding of said load in said lowering and said raising cycle throughout the complete operative range.

2. The device of claim 1, wherein the desired speed value setting means for the speed control means is a potentiometer (46) comprising an adjusting member (44) and micro switches generating directional signals.

3. The device of claim 1, wherein the desired field current value setting means (62) calculates the desired value for the field current from the desired value of the armature current and the actual speed signal.

4. The device of claim 1, wherein the armature is connected to the battery thorough a half-bridge including cyclically controlled Mosfets and diodes connected to the Mosfets in an antiparallel arrangement.

5. The device of claim 1, wherein the field winding is connected in the crossing branch of a bridge circuit comprising four cyclically controlled Mosfets and diodes connected to the Mosfets in an antiparallel arrangement.

6. The device of claim 1, for a lift mast comprising at least a movable mast portion and load carrying means which are adjustable in height with respect to the movable mast portion, wherein a sensor is provided at the lift mast to generate signals representative of whether or not a lowering cycle of the movable mast portion or the load carrying means is performed and wherein the signals are fed to the desired speed value setting means for modifying the desired speed value signal.

7. A hydraulic lift device for battery operated industrial trucks comprising at least a hydraulic ram to elevate or lower a load in an operative range, a hydraulic power pack operating as a pump in a load raising cycle by delivering pressurized fluid to said ram and operating as a motor in the load lowering cycle in driving the hydraulic power pack by pressurized fluid displaced from said ram, an electrical power means coupled to said hydraulic power pack operating as a motor in the load raising cycle and as a generator in the load lowering cycle, valve means disposed in the fluid path between said hydraulic ram and said hydraulic power pack to hold said load at desired positions of said hydraulic ram, a control means actuating said valve means, said control means including a directional sensor, a speed control controlling the speed of said electrical power means, characterized by said valve means having a single load holding valve operating free of loss in its opened position, said power means comprising a three-phase induction motor to be operated as said motor in said load raising cycle and as said generator in said load lowering cycle, said speed control means controlling the stator frequency in response to an error signal determined as a function of an actual speed value and a predetermined desired speed value, an energy recovering circuitry which is fed by said power means in the load lowering cycle, said control means including a directional sensor and controlling the load holding operation throughout the complete operative range.

* * * * *